Oct. 19, 1954     H. BRYNGE     2,691,897
TOOTH PROFILE FOR ADJUSTABLE WORMS AND RACKS
Filed Aug. 18, 1949     2 Sheets-Sheet 1

INVENTOR:
HANNES BRYNGE
BY
Richardson, David and Nordon
ATTORNEYS

Patented Oct. 19, 1954

2,691,897

UNITED STATES PATENT OFFICE 2,691,897

TOOTH PROFILE FOR ADJUSTABLE WORMS AND RACKS

Hannes Brynge, Enkoping, Sweden

Application August 18, 1949, Serial No. 110,915

Claims priority, application Sweden August 27, 1948

2 Claims. (Cl. 74—458)

The present invention relates to the shape of a tooth profile for an adjustable worm and rack such as the worm and rack used in an adjustable wrench.

An object of the invention is to provide an adjustable worm and rack in which the tooth profile of the rack and the corresponding profile of the helical thread of the worm are shaped to provide a maximum of strength combined with a minimum amount of play as the degree of engagement between the rack and the helix varies.

Other and further objects of the invention will become apparent upon reading the following specification together with the accompanying drawing forming a part hereof:

Referring to the drawing.

Figure 1:
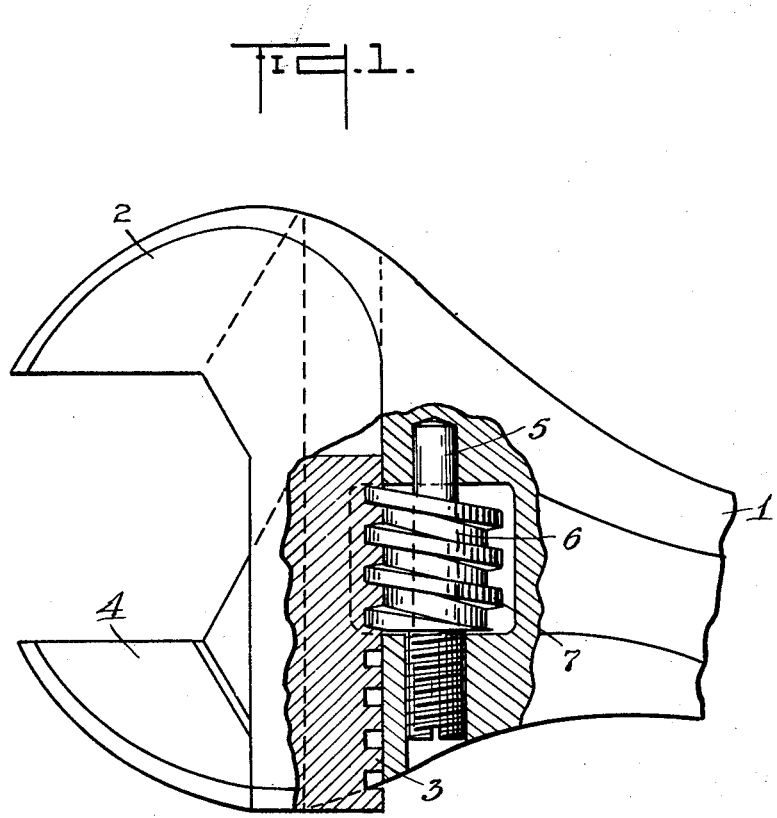
Fig. 1 is a fragmentary side view of an adjustable wrench, partly broken away to show details of construction, the tooth profile of the invention being suitable for use in a wrench of this type.

Referring to Fig. 1, there is shown a wrench consisting of a handle 1 and a fixed jaw 2. An adjustable jaw 4 is provided with a rack having teeth 3 formed thereon. The rack teeth 3 engage the convolutions of a helical thread 7 formed on an adjusting worm 6, the worm 6, being revolubly mounted on a pivot pin 5 threadedly secured in the handle 1.

Figure 2:
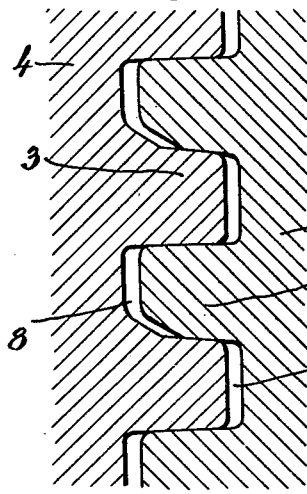
Figs. 2 and 3 are enlarged sectional views showing tooth and thread profiles in accordance with the invention.
Figure 3:
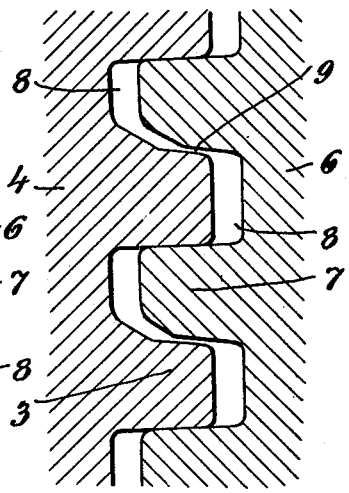

In accordance with one form of the invention, the profiles of the rack teeth 3 and worm helix 7 are of complementary shapes, as shown in Figs. 2 and 3. When the worm and rack move apart slightly from the position shown in Fig. 2, to the position shown in Fig. 3, longitudinal play develops as indicated by the space at 9. As shown in Figs. 2 and 3, the profile of the rack teeth 3 has a portion of appreciable taper at one side to provide a gradually thickened and strengthened portion proceeding toward the root of the profile. The taper begins at a substantial distance from the root of the profile. The remainder of the tapered side of the profile has only a relatively slight taper. The other side of the profile is substantially untapered. This provides a maximum of tooth strength, and at the same time, variations in the degree of engagement between the worm and the rack will be accompanied by variations in clearance permitting a minimum of relative axial movement between the worm profile 7 and the rack teeth 3.

Figure 4:
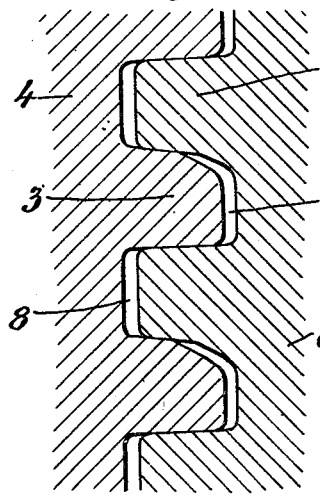
Figs. 4 and 5 are views similar to Figs. 2 and 3 showing tooth and thread profiles in accordance with a modified form of the invention.
Figure 5:
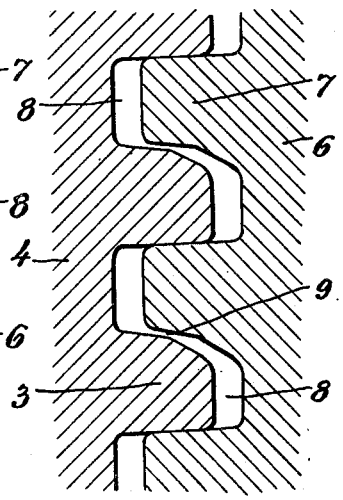

Figs. 4 and 5 are similar to Figs. 2 and 3, except that the profile 7 of the helical thread of worm 6 is provided with a portion of appreciable taper instead of the rack teeth 3. In Figs. 4 and 5, as in Figs. 2 and 3, the profile of the rack teeth 3 is complementary to the profile of the helical thread 7.

Having thus described my invention, I claim:

1. A worm and rack of the class described adapted for use in an adjustable wrench comprising: teeth on said rack engaging a helical thread on said worm, said teeth and said thread being shaped to provide profiles of complementary shapes, one of said profiles having a portion of appreciable taper on one side thereof to provide a gradually thickened and strengthened portion proceeding toward the root of said profile, said taper beginning at a substantial distance from said root and the remainder of said one side of said profile having a relatively slight taper, and the other side of said profile being substantially untapered whereby variations in the degree of engagement between said worm and said rack will be accompanied by variations in clearance permitting a minimum of relative axial movement between said worm and said rack.

2. A worm and rack according to claim 1, wherein said remainder of said profile provides a tooth of nearly uniform thickness.

References Cited in the file of this patent

UNITED STATES PATENTS

| Number | Name | Date |
|---|---|---|
| 1,133,236 | Peterson | Mar. 23, 1915 |
| 2,191,865 | Schlachter | Feb. 27, 1940 |